(12) United States Patent
Mower et al.

(10) Patent No.: US 9,762,442 B2
(45) Date of Patent: *Sep. 12, 2017

(54) VIRTUALIZATION OF NETWORKING SERVICES

(71) Applicant: Aerohive Networks, Inc., Milpitas, CA (US)

(72) Inventors: Carl Steven Mower, Sunnyvale, CA (US); Matthew Alan Palmer, Menlo Park, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,212

(22) Filed: Nov. 11, 2016

(65) Prior Publication Data
US 2017/0063623 A1    Mar. 2, 2017

Related U.S. Application Data

(63) Continuation of application No. 12/357,362, filed on Jan. 21, 2009, now Pat. No. 9,503,354.
(Continued)

(51) Int. Cl.
*H04L 12/28* (2006.01)
*H04L 12/24* (2006.01)
(Continued)

(52) U.S. Cl.
CPC ...... *H04L 41/0853* (2013.01); *H04L 12/2803* (2013.01); *H04L 12/4641* (2013.01);
(Continued)

(58) Field of Classification Search
None
See application file for complete search history.

(56) References Cited

U.S. PATENT DOCUMENTS 5,832,503 A    11/1998  Malik et al.
5,872,928 A     2/1999  Lewis et al.
(Continued)

*Primary Examiner* — Zewdu A Beyen
(74) *Attorney, Agent, or Firm* — Sheppard, Mullin, Richter & Hampton LLP

(57) ABSTRACT

A method of configuring a virtual network comprises: running a user-interactive business requirements wizard from a server, the wizard collecting business requirements from a user; translating the business requirements into technical requirements for a network configuration using the server; selecting a network configuration from a network configuration database using the server, the selecting utilizing the technical requirements; testing the network configuration using a processor; monitoring the testing and generating new facts regarding performance of the network configuration, using the processor; feeding back the new facts to the server for use by the server in the selecting; and repeating the selecting, testing, monitoring and generating, and feeding back, until the server determines a criterion for network stability has been reached. The method may include automatically discovering local network characteristics using a networking device, prior to the selecting, sending the characteristics to the server for use by the server in the selecting.

15 Claims, 2 Drawing Sheets

Related U.S. Application Data

(60) Provisional application No. 61/021,884, filed on Jan. 17, 2008.

(51) Int. Cl.
*H04L 12/26* (2006.01)
*H04L 12/46* (2006.01)

(52) U.S. Cl.
CPC ...... *H04L 41/0273* (2013.01); *H04L 41/0856* (2013.01); *H04L 41/0869* (2013.01); *H04L 43/50* (2013.01); *H04L 41/22* (2013.01)

(56) References Cited

U.S. PATENT DOCUMENTS

| | | | |
|---|---|---|---|
| 6,011,910 | A | 1/2000 | Chau et al. |
| 6,799,272 | B1 | 9/2004 | Urata |
| 7,131,141 | B1 | 10/2006 | Blewett et al. |
| 7,207,061 | B2 | 4/2007 | Martin |
| 7,353,259 | B1 | 4/2008 | Bakke et al. |
| 7,461,158 | B2 | 12/2008 | Rider et al. |
| 7,499,438 | B2 | 3/2009 | Hinman et al. |
| 7,546,632 | B2 | 6/2009 | Stieglitz et al. |
| 7,751,392 | B1 | 7/2010 | Gonzalez et al. |
| 7,865,557 | B2 | 1/2011 | Tomkow |
| 7,865,577 | B1 | 1/2011 | O'Neil et al. |
| 7,865,727 | B2 | 1/2011 | Zeng et al. |
| 8,259,616 | B2 | 9/2012 | Mower et al. |
| 8,447,843 | B2 | 5/2013 | Johnson et al. |
| 2002/0138443 | A1 | 9/2002 | Schran et al. |
| 2002/0194369 | A1 | 12/2002 | Rawlins et al. |
| 2003/0009689 | A1 | 1/2003 | Kolb |
| 2003/0048750 | A1 | 3/2003 | Kobayashi |
| 2003/0055935 | A1 | 3/2003 | Tarrant et al. |
| 2003/0074429 | A1 | 4/2003 | Gieseke et al. |
| 2003/0117951 | A1 | 6/2003 | Wiebe et al. |
| 2003/0120624 | A1 | 6/2003 | Poppenga et al. |
| 2003/0212775 | A1* | 11/2003 | Steele ............... G06F 8/60 709/223 |
| 2003/0212908 | A1 | 11/2003 | Piesco |
| 2004/0098472 | A1 | 5/2004 | Styles et al. |
| 2004/0205201 | A1 | 10/2004 | Katsube et al. |
| 2004/0233234 | A1* | 11/2004 | Chaudhry ......... H04L 41/145 715/735 |
| 2005/0192969 | A1 | 9/2005 | Haga et al. |
| 2005/0246346 | A1 | 11/2005 | Gerdes et al. |
| 2006/0075001 | A1 | 4/2006 | Canning et al. |
| 2006/0167988 | A1 | 7/2006 | Barck et al. |
| 2006/0200856 | A1 | 9/2006 | Salowey et al. |
| 2006/0236093 | A1 | 10/2006 | Brok et al. |
| 2007/0014248 | A1 | 1/2007 | Fowlow |
| 2007/0043860 | A1 | 2/2007 | Pabari |
| 2007/0136804 | A1 | 6/2007 | Ohsawa et al. |
| 2007/0162514 | A1* | 7/2007 | Civetta ............ G06F 17/30312 |
| 2007/0274285 | A1 | 11/2007 | Werber et al. |
| 2008/0002823 | A1 | 1/2008 | Fama et al. |
| 2008/0043627 | A1 | 2/2008 | Singh et al. |
| 2008/0046995 | A1 | 2/2008 | Satterlee et al. |
| 2008/0301667 | A1 | 12/2008 | Rao et al. |
| 2009/0052338 | A1 | 2/2009 | Kelley et al. |
| 2009/0112734 | A1 | 4/2009 | Viehmann et al. |
| 2009/0164579 | A1 | 6/2009 | Chaudhry |
| 2009/0276530 | A1 | 11/2009 | Gentry et al. |
| 2009/0296604 | A1 | 12/2009 | Karaoguz et al. |
| 2009/0327398 | A1 | 12/2009 | Campbell et al. |
| 2010/0218104 | A1 | 8/2010 | Lewis |

* cited by examiner

VIRTUALIZATION OF NETWORKING SERVICES

CROSS-REFERENCE TO RELATED APPLICATIONS

This application is a continuation application of U.S. patent application Ser. No. 12/357,362, filed on Jan. 21, 2009, which claims the benefit of U.S. Provisional Application No. 61/021,884, filed Jan. 17, 2008, which are incorporated by reference herein.

BACKGROUND

Existing networking hinges on building purpose-driven devices—each networking device is built to solve a particular problem or set of problems. Adding a new feature to the network often entails adding a new device to the network, or replacing an existing network device. This is expensive and very time-consuming. There is a need for network configurations and methods for expanding networks which are inexpensive and efficient.

Validating that networks of networking devices, for example, as in computer networks, will in fact perform their desired function typically requires building that actual network which is both expensive and time consuming. For larger networks, this is simply impractical. There is a need for an inexpensive and efficient method for validating networks of networking devices.

Today's network management solutions expect users to speak the language of networking. However, a user may not be that familiar with networking terminology and may simply want to solve a business problem. There is no reason such users should have to be certified experts to configure networks whose solutions are well understood and relatively well standardized. However, existing network management solutions require users to understand networking at a very technical level. Even home networking devices express their questions in terms of networking terminology, rather than in terms of the problem the user is attempting to solve. There is a need for more user friendly network configuration tools. There is a need for network management solutions which ask the required questions in business terms, rather than networking terms.

Correctly configuring devices to form a network can be very difficult. Today, network administrators rely heavily on personal knowledge, prior working configurations, and nuggets of wisdom from other sources to make working configurations for their networking devices. Unfortunately, these nuggets of wisdom are spread among many sources and have varying levels of trustworthiness. There is a need for more efficient and trustworthy methods for building networks.

DETAILED DESCRIPTION

Figure 1:
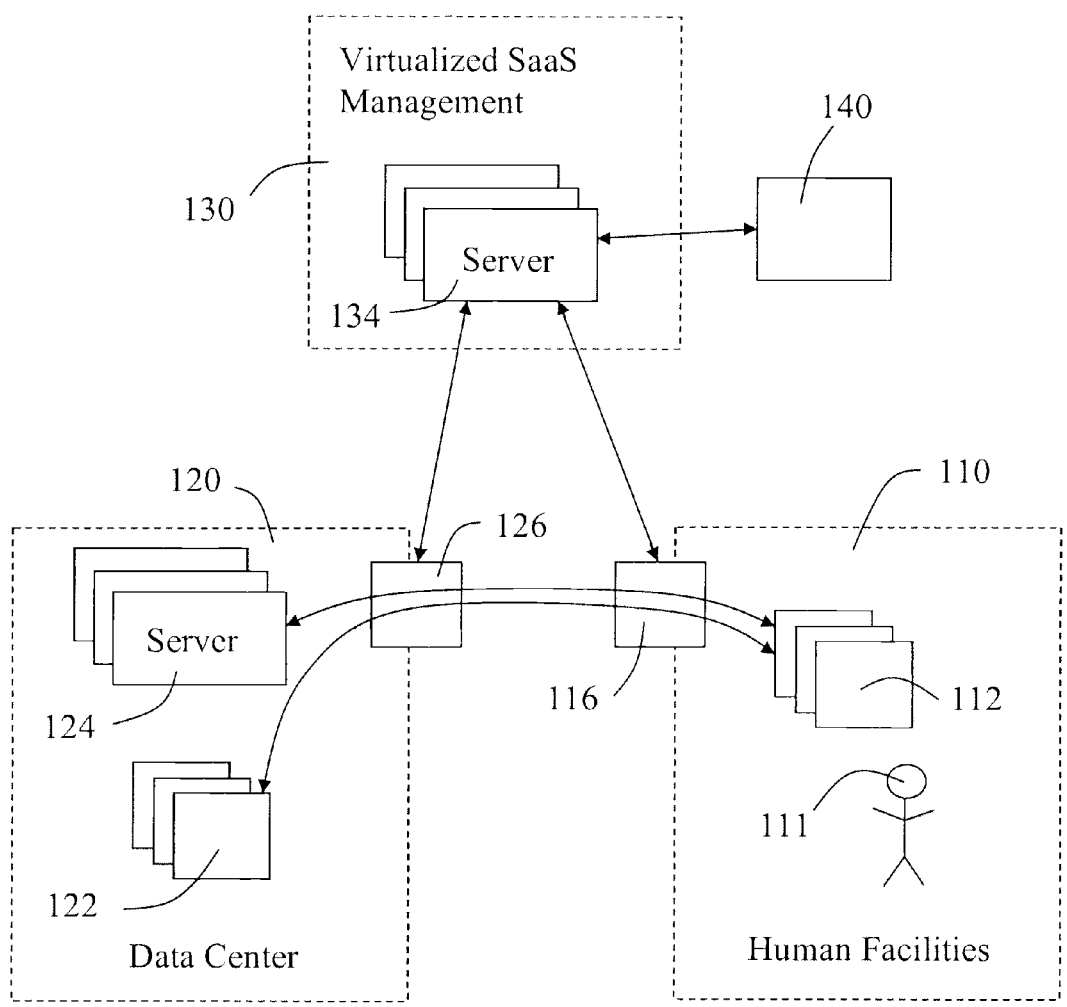
FIG. 1 shows a schematic representation of a virtual network.

FIG. 1 shows an example of a virtual network. Human facilities 110 are connected to a data center 120 via any Ethernet. The Human facilities 110 are connected to the Ethernet by a network device 116. The data center 120 is connected to the Ethernet by network device 126. The human facilities comprise devices 112 which allow end users 111 to access the virtual network. The data center 120 comprises devices 122 and servers 124. The network devices 116 and 126 are connected via the Internet to a virtualized software as a service (SaaS) management center 130. The virtualized SaaS management center 130 comprises servers 134. The virtualized SaaS management center 130 may be integrated with business applications 140 for automated management of network devices. Many organizations have network management applications (business application 140), sometimes home-grown, sometimes purchased from vendors, that solve a specific portion of their network management problem—for example, a company might use Splunk for managing the log files generated by their networking devices. These network management applications may be integrated with the virtualized SaaS management center 130. Even though FIG. 1 shows only two network devices, there can clearly be any number of network devices within a virtual network.

The combination of virtualized appliances, such as network devices 116 and 126, and management, such as virtualized SaaS management, creates a network as a service (NaaS). Virtualization of the appliances and management increases security and control of the network while significantly reducing costs. For the end user 111, access to the network is via a network device 116 whose primary functions are to ensure reliable and secure network access. Physically the network device 116 is connected to any Ethernet, and utilizes a Northbound Internet Protocol (IP) address. A Northbound IP address is the IP address on the interface that connects a networking device to the larger network, typically the Internet. The minimal amount of software required to deliver reliable and secure network access is installed and run on the network device 116. The end user's actual network is a virtual connection that terminates at a second network device 126 located at the data center 120. virtualized SaaS management center 130, including network service selection, configuration, testing and monitoring, resides in the "cloud." The network device management is a multi-tenant virtualized SaaS application. Multiple clients/companies may use the same SaaS application without one client/company having any visibility to any of the others. Business applications 140 may be integrated with the SaaS system for automated management. The virtualized SaaS management center 130 is accessible to information technology administration and appliances, such as network devices 116 and 126, via the Internet.

Virtualization involves replacing a purpose-built appliance with a generic central processing unit (CPU) that serves the same purpose, typically at lower cost. Virtualization of a desktop/laptop computer still requires a piece of hardware within reach of the end-user, but the requirements on that hardware are significantly reduced compared to a purpose-built personal computer. If separate hardware for the networking device is required at the end-users' location, the requirements on the networking device are significantly reduced compared with networking devices that are not managed by virtual SaaS. Instead of building purpose-driven networking devices, embodiments deploy off-the-shelf, generic hardware that is capable of hosting many different features and functions. For example, for a telecommuter, the generic hardware might be a general x86 class processor running Linux.

The Web-based network management system, replaces purpose-built network management appliances and/or software running on a dedicated personal computer, at significantly lower cost. New features and functions may be deployed transparently to network devices. See U.S. Provisional Application No. 61/021,883, incorporated by reference herein, for examples of systems and methods for transparent deployment of new features and functions. New features are released to the network devices by the network management software, not by the network administrator. The releases may be run as a Web service, using heart beat servers, for example. See U.S. Provisional Application No. 61/021,883, incorporated by reference herein, for examples of heart beat servers. This Web service allows for each network device to always be running the latest software, including all patches.

Virtualization easily allows multiple instances of the same function, running independently. The Web-based network management system may allow divisions of a network to be managed independently, by different domains of control. Furthermore, virtualization allows more capacity to be added to a network in small increments. Embodiments may allow more capacity—more nodes/devices and more end users—to be added to the existing network in small increments.

Significant benefits of embodiments over alternative approaches are that such a virtualized implementation of a network has much greater flexibility and longevity. Networking devices need no longer be dedicated to a single purpose and replaced when a second or third function is needed. There is a cost to virtualization of a network—typically a few percentage points of performance as compared to networks with purpose-driven devices—but the benefits of flexibility and longevity are seen as far outweighing the cost of a couple percentage points of performance.

Virtualize the Networking Device Itself

Networking services are described above as running on dedicated hardware. In further embodiments those same networking services may be run by a virtual machine hypervisor running on an end-user's computer—in other words, the networking device itself is virtualized. In such a scenario, the end-user's computer runs some type of virtual machine hypervisor, for example, the open-source Xen hypervisor or virtual machine hypervisors available from VMware. The virtual machine hypervisor on the end user's computer runs several virtual machines—typically one for work purposes, often one for personal use, and a virtual machine to run the networking services necessary to support the other virtual machines. The key concept is that the same functions that make an external networking device necessary to arbitrate the use of the common network among physical computers and/or devices are the same functions that must be provided by a virtual networking device resident on a computer with multiple virtual machines.

The networking services that may be run by the virtual machine include, but are not limited to, the following: Quality-of-Service (QoS), network traffic tunneling, and filtering and scrubbing of network traffic. This is merely an illustrative, not exhaustive list.

QoS network service arbitrates the use of the physical network connection among the other virtual machines. For example, priority would likely be given to packets of data to/from the work-related virtual machines over traffic to/from any personal virtual machines.

Network traffic tunneling may be used to tunnel corporate traffic to corporate headquarters securely. Furthermore, traffic to/from work-related virtual machines and to/from remote work locations, for example, may be captured and sent in a secure tunnel. (Traffic to/from the same destinations and to/from non-work virtual machines may not warrant the same level of protection and would not be captured for conveyance via such tunnels, but would be sent to the Internet without the protection of a tunnel.)

Scrubbing and/or filtering services may be desirable to "scrub" traffic for malware and/or to filter access to questionable destinations (rated as containing violent content, for example); all traffic to/from work virtual machines could be forcibly re-directed to the appropriate services under contract to perform such scrubbing and/or filtering, whereas traffic to/from non-work virtual machines would not.

Furthermore, the networking device at the data center may also be replaced by a virtual machine hypervisor, as can any networking device in a virtual network configured and operated.

Use of Virtualized Server Resources in the Testing and Validation of Virtualized Computer Networks A networking device consists of two parts: the upper layers, software only, which add functions desired that are not simply readily available software modules, and the lower layers (software and hardware) which are readily available software and/or hardware modules, including operating system. A virtual machine may be used to emulate the hardware. Rather than obtaining a collection of physical networking devices, virtual servers may be leased, (e.g. Amazon's EC2 facility), in order to run this upper layer software on a virtual server. A collection of such virtual servers can then simulate a network of virtual networking devices where the behavior of the network at large can be tested and validated.

Figure 2:
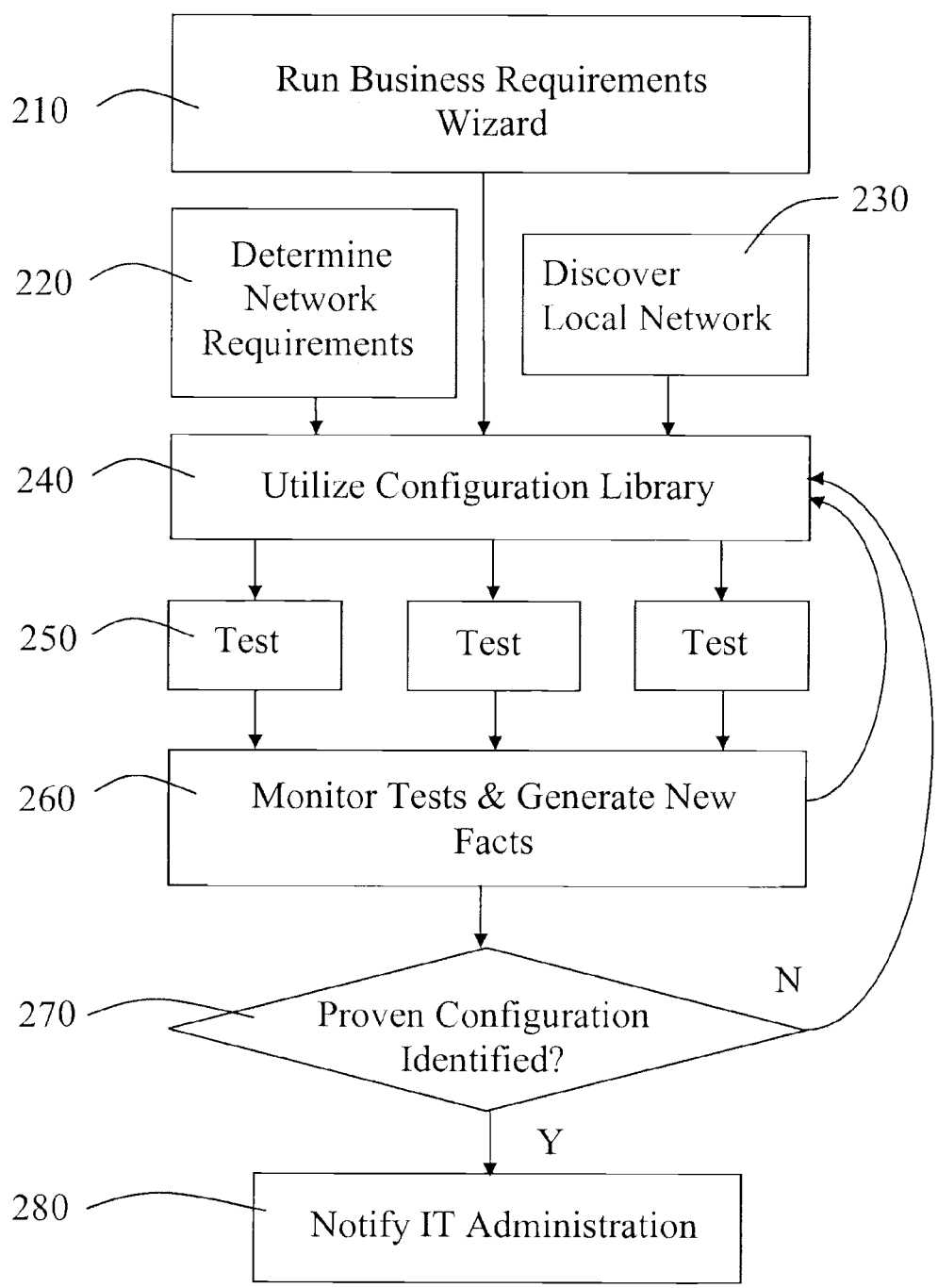
FIG. 2 shows a representation of an inference-based network configuration method.

An important step in virtualizing a network is recognizing the environment in which the networking devices will be used. The inference based network configuration methodology is shown in FIG. 2. Business goals/requirements are defined with assistance from a business requirements wizard and are translated into technical requirements for a virtual network 210. Further user input is used to determine network requirements 220. Network discovery information is leveraged for site specific settings 230. Some examples of network discovery are: the network device can automatically detect that it has certain hardware attributes—perhaps a DSL link, or a cellular data card; the device could detect the speed of its uplink to the Internet, and based on the connection being fast (5 Mbit+) or slow (1-3 Mbit) make different configuration choices without human intervention. The way in which the processes 220 and 230 work together in parallel is shown by the following example. Imagine there are 1000 remote workers that need network connectivity. All workers are in the New York City metropolitan area. Some have FiOS (10+ Mbit fiber connections), and some just have DSL/cable. The networking device can automatically, and without human intervention, determine the approximate speed of its uplink—this is discovering the local network 230. The human administrator divides the users between two groups, "clerical" and "management"—this is an example of information that only a human can provide and is provided by process 220—determine network requirements. If the desired policy is that streaming video is only allowed for managers with high-speed WAN links, you'd need to know both the "determine network requirements" and the "discover local network" parts in parallel. Discovering local networks 230 is non-intrusive or has a limited impact on the availability and integrity of the network. The network devices can do the discovery and make minor improvements step-by-step. Furthermore, the networking configuration generated by the process can contain a portion which is not for network control per se, but for monitoring the effects of the configuration to see if it is optimal, and collect statistics to further optimize the settings. Using the prior example, the resultant policy—only managers that have high-speed WAN connections can do streaming video—could be monitored by measuring the percentage of the WAN consumed by such streaming video. If a large fraction of those allowed to do such streaming end-up consuming 80% of the WAN with such streaming, that fact may cause the policy in the next iteration to change itself to apply some limit to the amount of streaming traffic permitted for those users.

Modular and inference-based configuration settings are available for specific modules for specific functions, such as routing, firewall, virtual private network (VPN), etc., from a configuration library; network configurations are selected from the configuration library 240. The resulting virtual networks are tested 250. Multiple configurations may be tested in parallel. Monitoring of testing generates new facts 260. Instant updates are available—new facts from monitoring are fed back into the selection of network configurations process 240. A proven configuration is generated by an iterative process using feedback from process 260 to process 240 until some pre-determined criterion for network stability and integrity is reached. See the example above regarding iteration of a policy to permit only managers that have high-speed WAN connections to do streaming video. Another example is continuous measurement of the response time to some known server. If or when that response time becomes statistically slower, rate limits may be added/increased to mitigate the degradation.

Whether a proven configuration has been identified 270 is subjective. A specified criterion may be set and when it is reached the iteration may be stopped. Information technology administration is notified when a better proven configuration is created for one of their networks 280. Note that the network is constantly monitored for changes, and if it changes the configuration may also be modified, following the process flow of FIG. 2.

Referring to FIGS. 1 and 2, the components of the virtual network that are involved in the processes shown in FIG. 2 are identified. A GUI is generated by server 134 for the business requirements wizard 210; the business requirements are translated into requirements for a virtual network 210 by the server 134. The GUI is displayed for the user 111 on device 112. The user input for determining network requirements 220 is via the device 112. The networking devices 116 and 126 automatically discover local networks 230. The processes 210, 220 and 230 provide input to the server 134 for the server to execute process 240. The configuration library is a database on server 134, and the server 134 selects network configurations from the configuration library 240. The testing 250 and monitoring and generating of new facts 260 processes are run on either the server 134 or on a processor of the networking devices 116 and/or 126. The new facts are fed back to the server 134, for the server to make adjustments to the selection of network configurations. Processes 270 and 280 are handled by server 134.

Further to the process of FIG. 2, network mis-configurations may be reduced by regression testing.

A significant benefit of embodiments of techniques described in this paper over alternative approaches is that they provide a significantly less expensive method of network configuration. Today's alternative approaches—actually building such networks—become prohibitively expensive, particularly for large numbers of networking devices. Driving Networking Device Configuration from Business Requirements by Use of User Interface Wizards A technique involves asking users of the network management system questions in the language of the business requirements driving the need for a networking solution. This is done in a progressive set of questions that narrow-in on the small number of technical solutions that would address those business requirements. See business requirements wizard 210 in FIG. 2.

For example, in 802.11b/g wireless, the wireless local area network (LAN) can be unencrypted, or encrypted with wired equivalency privacy (WEP), Wi-Fi Protected Access (WPA), or WPA2—the follow-on security method to WPA. Rather than present the user with those choices, a few business requirement oriented questions can determine if the user needs secure wireless, and to what level of security, rather than requiring them to understand the technical differences between WEP and WPA. For example, question 1 might be: "Are you trying to provide open wireless access to all possible users, or a secure wireless network?" If open, then make an open wireless network; if secure, ask the next question. Question 2 is: "Are all your wireless clients of 2004 vintage or later?" If yes, use WPA2; if no, ask next question. Question 3 is: "Are any of your wireless clients from 1999 or before?" If yes, use WEP; otherwise use WPA.

Significant benefits of the techniques described in this paper over alternative approaches are that using this approach allows employees that are of a skill level comparable to those who administer E-mail systems to answer the necessary questions rather than requiring much more expensive networking experts, such as Cisco Certified Internetwork Experts (CCIEs).

Collection of Validated Networking Device Settings for the Purpose of Reducing Misconfiguration Errors As an integral part of the network management solution, a library of tested, proven configurations are offered to the management station user. These configurations have been tested by the vendor and proven in real-world networks. Over time, this library of proven configurations grows in size and scope, addressing ever more varied business requirements. See discussion above of the configuration library, in relation to process 240 in FIG. 2.

Significant benefits of the techniques described herein over alternative approaches are that relying on the Network Administrator to be the collection point for bits of networking device configuration wisdom is an error-prone process and yields unpredictable results in terms of correctness.

What we claim is:

1. A method comprising:
  querying a user of business requirements to achieve desired network solutions of a network of the user by asking the user questions in the language of the business requirements to achieve the desired network solutions of the network;
  translating the business requirements into technical requirements in the language of network terminology for configuring the network using answers by the user to the questions in the language of the business requirements;
  selecting a network configuration to achieve the desired network solutions of the network according to the network terminology generated based on the answers by the user to the questions in the language of the business requirements;
  configuring the network to operate according to the network configuration determined using the network terminology generated based on the answers by the user to the questions in the language of the business requirements;

selecting another network configuration to achieve the desired network solutions of the network according to the network terminology generated based on the answers by the user to the questions in the language of the business requirements;

configuring the network to operate according to the another network configuration and the network configuration in parallel, both the network configuration and the another network configuration determined using the network terminology generated based on the answers by the user to the questions in the language of the business requirements;

monitoring operation of the network in operating in parallel according to the another network configuration and the network configuration;

modifying the another network configuration and the network configuration based on the operation of the network in operating in parallel according to the another network configuration until a proven configuration is identified;

configuring the network to operate according to the proven configuration in response to identification of the proven configuration;

discovering characteristics of the network; and selecting the network configuration based on both the characteristics of the network and the network terminology generated based on the answers by the user to the questions in the language of the business requirements.

2. The method of claim 1, wherein the network is a virtual network.

3. The method of claim 1, further comprising:

monitoring operation of the network in operating according to the network configuration;

discerning whether a pre-determined criterion of network stability of the network is met based on the operation of the network in operating according to the network configuration;

modifying the network configuration to achieve the desired network solutions of the network using the technical requirements in the language of the network terminology if it is determined that the pre-determined criterion fails to be met; and further configuring the network to operate according to a modified network configuration determined based on modifying the network configuration to achieve the desired network solutions of the network using the technical requirements in the language of the network terminology.

4. The method of claim 1, further comprising:

monitoring operation of the network in operating according to the network configuration;

discerning whether a pre-determined criterion of network stability of the network is met based on the operation of the network in operating according to the network configuration;

modifying the network configuration to achieve the desired network solutions of the network using the technical requirements in the language of the network terminology if it is determined that the pre-determined criterion fails to be met;

further configuring the network to operate according to a modified network configuration determined based on modifying the network configuration to achieve the desired network solutions of the network using the technical requirements in the language of the network terminology;

monitoring additional operation of the network in operating according to the modified network configuration discerning whether the pre-determined criterion of network stability of the network is met based on the additional operation of the network in operating according to the modified network configuration; and identifying the modified network configuration as a proven network configuration for achieving the desired network solutions, if it is determined that the pre-determined criterion of network stability of the network is met based on the additional operation of the network in operating according to the modified network configuration.

5. The method of claim 1, further comprising:

monitoring operation of the network in operating according to the network configuration;

discerning whether a pre-determined criterion of network stability of the network is met based on the operation of the network in operating according to the network configuration;

modifying the network configuration to achieve the desired network solutions of the network using the technical requirements in the language of the network terminology if it is determined that the pre-determined criterion fails to be met;

further configuring the network to operate according to a modified network configuration determined based on modifying the network configuration to achieve the desired network solutions of the network using the technical requirements in the language of the network terminology;

monitoring additional operation of the network in operating according to the modified network configuration;

discerning whether the pre-determined criterion of network stability of the network is met based on the additional operation of the network in operating according to the modified network configuration;

if it is determined that the pre-determined criterion of network stability of the network is met based on the additional operation of the network in operating according to the modified network configuration:

identifying the modified network configuration as a proven network configuration for achieving the desired network solutions; and notifying an administrator of the network that the modified network configuration is the proven network configuration for achieving the desired network solutions, the administrator capable of configuring other networks according to the modified network configuration to achieve the desired network solutions within the other networks.

6. The method of claim 1, further comprising:

discovering characteristics of the network, the characteristics of the network including hardware attributes of the network; and selecting the network configuration based on both the characteristics of the network and the network terminology generated based on the answers by the user to the questions in the language of the business requirements.

7. The method of claim 1, wherein the questions in the language of the business requirements to ask the user are progressively determined and posed to the user based on previous answers to the questions by the user.

8. The method of claim 1, wherein the network configuration is selected from a configuration library comprised of a plurality of proven configurations tested to meet specific business requirements to achieve specific desired network solutions of networks.

9. A system comprising: one or more processors;
memory storing instructions configured to instruct the one or more processors to:
query a user of business requirements to achieve desired network solutions of a network of the user by asking the user questions in the language of the business requirements to achieve the desired network solutions of the network;
translate the business requirements into technical requirements in the language of network terminology for configuring the network using answers by the user to the questions in the language of the business;
select a network configuration to achieve the desired network solutions of the network according to the network terminology generated based on the answers by the user to the questions in the language of the business requirements;
configure the network to operate according to the network configuration determined using the network terminology generated based on the answers by the user to the questions in the language of the business requirements;
select another network configuration to achieve the desired network solutions of the network according to the network terminology generated based on the answers by the user to the questions in the language of the business requirements;
configure the network to operate according to the another network configuration and the network configuration in parallel, both the network configuration and the another network configuration determined using the network terminology generated based on the answers by the user to the questions in the language of the business requirements;
monitor operation of the network in operating in parallel according to the another network configuration and the network configuration;
modify the another network configuration and the network configuration based on the operation of the network in operating in parallel according to the another network configuration until a proven configuration is identified;
configure the network to operate according to the proven configuration in response to identification of the proven configuration; discover characteristics of the network; and
select the network configuration based on both the characteristics of the network and the network terminology generated based on the answers by the user to the questions in the language of the business requirements.

10. The system of claim 9, wherein the network is a virtual network.

11. The system of claim 9, wherein the memory is further configured to instruct the one or more processors to:
monitor operation of the network in operating according to the network configuration; discern whether a pre-determined criterion of network stability of the network is met based on the operation of the network in operating according to the network configuration;
modify the network configuration to achieve the desired network solutions of the network using the technical requirements in the language of the network terminology if it is determined that the pre-determined criterion fails to be met; and further configure the network to operate according to a modified network configuration determined based on modifying the network configuration to achieve the desired network solutions of the network using the technical requirements in the language of the network terminology.

12. The system of claim 9, wherein the memory is further configured to instruct the one or more processors to:
monitor operation of the network in operating according to the network configuration; discern whether a pre-determined criterion of network stability of the network is met based on the operation of the network in operating according to the network configuration;
modify the network configuration to achieve the desired network solutions of the network using the technical requirements in the language of the network terminology if it is determined that the pre-determined criterion fails to be met;
further configure the network to operate according to a modified network configuration determined based on modifying the network configuration to achieve the desired network solutions of the network using the technical requirements in the language of the network terminology;
monitor additional operation of the network in operating according to the modified network configuration;
discern whether the pre-determined criterion of network stability of the network is met based on the additional operation of the network in operating according to the modified network configuration; and
identify the modified network configuration as a proven network configuration for achieving the desired network solutions, if it is determined that the pre-determined criterion of network stability of the network is met based on the additional operation of the network in operating according to the modified network configuration.

13. The system of claim 9, wherein the instructions are further configured to instruct the one or more processors to:
monitor operation of the network in operating according to the network configuration; discern whether a pre-determined criterion of network stability of the network is met based on the operation of the network in operating according to the network configuration;
modify the network configuration to achieve the desired network solutions of the network using the technical requirements in the language of the network terminology if it is determined that the pre-determined criterion fails to be met;
further configure the network to operate according to a modified network configuration determined based on modifying the network configuration to achieve the desired network solutions of the network using the technical requirements in the language of the network terminology;
monitor additional operation of the network in operating according to the modified network configuration;
discern whether the pre-determined criterion of network stability of the network is met based on the additional operation of the network in operating according to the modified network configuration;
identify the modified network configuration as a proven network configuration for achieving the desired network solutions, if it is determined that the pre-determined creation of network stability of the network is met based on the additional operation of the network in operating according to the modified network configuration; and notify an administrator of the network that the modified network configuration is the proven network configuration for achieving the desired network solutions, the administrator capable of configuring other networks according to the modified network configuration to achieve the desired network solutions within the other networks.

14. The system of claim 9, wherein the instructions are further configured to instruct the one or more processors to:
discover characteristics of the network, the characteristics of the network including hardware attributes of the network; and
select the network configuration based on both the characteristics of the network and the network terminology generated based on the answers by the user to the questions in the language of the business requirements.

15. The system of claim 9, wherein the questions in the language of the business requirements to ask the user are progressively determined and posed to the user based on previous answers to the questions by the user.

* * * * *

UNITED STATES PATENT AND TRADEMARK OFFICE
CERTIFICATE OF CORRECTION

PATENT NO. : 9,762,442 B2
APPLICATION NO. : 15/349212
DATED : September 12, 2017
INVENTOR(S) : Carl Steven Mowers and Matthew Alan Palmer It is certified that error appears in the above-identified patent and that said Letters Patent is hereby corrected as shown below:

Claim 9, Column 9, Line 16:
"the question in the language of the business;"
Should read:
-- the question in the language of the business requirements; --

Claim 13, Column 10, Lines 66 and 67:
"pre-determined creation of network stability of the network is"
Should read:
-- pre-determined criterion of network stability of the network is --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*